United States Patent [19]

Campbell

[11] Patent Number: 4,955,002
[45] Date of Patent: Sep. 4, 1990

[54] VIBRATORY, TIME VARIANT, PSEUDORANDOM SONAR SYSTEM

[75] Inventor: Donald R. Campbell, Houston, Tex.

[73] Assignee: Camex, Houston, Tex.

[21] Appl. No.: 387,713

[22] Filed: Jul. 31, 1989

[51] Int. Cl.$^5$ ............................................. G01J 15/00
[52] U.S. Cl. ..................................... 367/99; 367/100; 367/137
[58] Field of Search .................... 367/100, 134, 137, 1, 367/99

[56] References Cited

U.S. PATENT DOCUMENTS

| | | | |
|---|---|---|---|
| 2,997,662 | 7/1947 | Garner et al. | 331/78 |
| 3,958,214 | 5/1976 | Andrews, Jr. et al. | 367/137 |
| 4,086,560 | 4/1978 | Johnston et al. | 367/100 |
| 4,352,039 | 9/1982 | Hagood et al. | 310/328 |

*Primary Examiner*—Thomas H. Tarcza
*Assistant Examiner*—Daniel T. Pihulic
*Attorney, Agent, or Firm*—Hubbard, Thurman, Turner, Tucker & Harris

[57] ABSTRACT

A vibratory, time variant, pseudorandom sonar system includes a computer controlled pseudorandom digital sweep frequency source, a digital/analog converter for changing the digital output of the source to an analog output and a power amplifier for amplifying the analog output to drive a vibrator or other suitable transducer for injecting corresponding sound waves into a body of water for target detection. A memory is provided for storing the source's digitized output.

A target reflects the sound waves for detection by 3 arbitrary non-colinear hydrophones which outputs a plurality of analog signals corresponding to the reflected sound waves to a plurality of channels. Each channel includes a preamplifier and an analog/digital converter for digitizing the analog electrical signals for storage in the memory. A computer controlled timer determines the time lapse between the injection of the source signal and detection of the reflected source signal by each hydrophone of the hydrophone array, for storage in memory.

A computer fetches the time lapse signals (time variant signals) and computes the bearing and range to target. The computer is attached to a crosscorrelator, an oscilloscope and a plotter. The computer fetches the digitized source and reflected signals for the crosscorrelator which acts upon the digitized signals to produce a target signature. The oscilloscope displays the target signature, and bearing and range information. While the plotter plots the target course.

12 Claims, 1 Drawing Sheet

VIBRATORY, TIME VARIANT, PSEUDORANDOM SONAR SYSTEM

This invention relates to sonar systems and more particularly to an improved sonar system suitable for keeping submerged vessels under clandestine surveillance or for communicating with a submerged vessel without detection by an unauthorized submerged vessel.

BACKGROUND OF THE INVENTION

Sound Navigation and Ranging (SONAR) equipment transmit a sonic or ultrasonic pulse. The pulse is reflected from an object, and received back at the transmitter location. The elapsed time for the pulse gives target distance, and the directional characteristics of the transmitting-receiving transducer give target range. For underwater communication the pulses may be spaced to provide a communication code such as the Morse code, for example.

A problem with these original type sonar devices is that the pulses are readily detectable by listening devices located on the target or other stations. From this information the target or other stations can determine the direction and range to the transmitting sonar or decode the communication or both.

To maintain the secrecy of the sonar transmitter and its communications various sonar systems have been developed. For example, it has been known to tape the natural ambient noises at a location in a body of water whose depth is to be measured. The recorded noise signals are projected back into the surrounding water to reflect off the bottom. The return signals are received for correlation with the projected recorded noises. The time delay required to correlate the signals is used to determine the depth of the water. Those persons desiring more information for this system are referred to U.S. Pat. No. 4,086,560 issued Apr. 25, 1978 to Johnston et al for a Secret Depth Sounder.

Another known device modulates transmitted intelligence signals with one or more disturbing oscillatory signals within a whole frequency band, such as that of the human voice, while maintaining the amplitude thereof only slightly higher than the maximum amplitude of transmitted intelligence signals. The signals of this system are easily detected and any code decoded. To make such system secure, an encoded echo-ranging signal generator was developed which included a digital shift register having binary encoded stages. A digital message encoder has a corresponding number of stages connected to the stages of the digital shift register for setting a predetermined program of zeros and ones in accordance with a selected code.

A shift pulse generator is provided to timely shift the shift register. An anti-coincidence circuit has a pair of inputs connected, respectively, to a predetermined stage and output of the digital shift register. The output of the circuit is connected to the input of the digital shift register. Thus, the binary contents of the encoded stages are randomly recirculated through the shift register and out through an echo-ranging system. This device overcomes substantially the disadvantages of the preceding devices, as the encoding of the transmitted intelligence signal may be made so complex that it is practically impossible to decode it without having appropriate decoding equipment having the key thereto. The device is advantageous in the sonar, radar, or other echo-ranging fields. Those persons desiring additional information for the system are referred to U.S. Pat. No. 3,958,214 issued May 18, 1976 to Andrews, Jr. et al for an Encoded Echo-Ranging Signal Generator.

A disadvantage of the known systems is their failure to make it virtually impossible for a target to discover that it is under surveillance and messages are being transmitted in their vicinity.

SUMMARY OF THE INVENTION

Accordingly, it is an object of this invention to provide a new and improved secret sonar system for keeping a target under surveillance without disclosing its presence to the target.

Another object of this invention is to provide a secret system for keeping a target under surveillance using signals indistinguishable from the normal noise present in the environment.

Still another object of the invention is to provide a secret system for keeping a target under surveillance while transmitting information secure from a target not having knowledge thereof.

A further object of this invention is to provide an improved technique for generating a controlled pseudorandom noise signal.

Briefly stated the vibratory, time variant, pseudorandom sonar system constituting the subject matter of this invention includes a vibrator to generate acoustic waves having amplitudes indicative of the sweep of pseudorandom acoustic or ultrasonic signals containing frequencies within the same spectrum as the environment. Such frequencies include the noise spectrum found in the body of water, ship, engine or screw noise spectrum. Echo waves (acoustic waves reflected from a target) are detected by a plurality of detectors of a detector array, converted to electrical signals which are digitized and compressed using the crosscorrelation technique. The crosscorrelation uses the digitized electrical signal corresponding to the sonic or ultrasonic transmission as the crosscorrelation operator (reference signal) which is multiplied by the digitized signal corresponding to the incoming (echo) signal to provide a signature pulse. The time lapses between the injection of the acoustic wave and receipt of the echo by the plurality of detectors of the detector array provides the time variant signals used for determining bearing and range information.

BRIEF DESCRIPTION OF THE DRAWINGS

Other objects and features of this invention will become more readily apparent and understood by reference to the following detailed description when read in conjunction with the drawings in which.

DETAILED DESCRIPTION OF A PREFERRED EMBODIMENT

Figure 1:
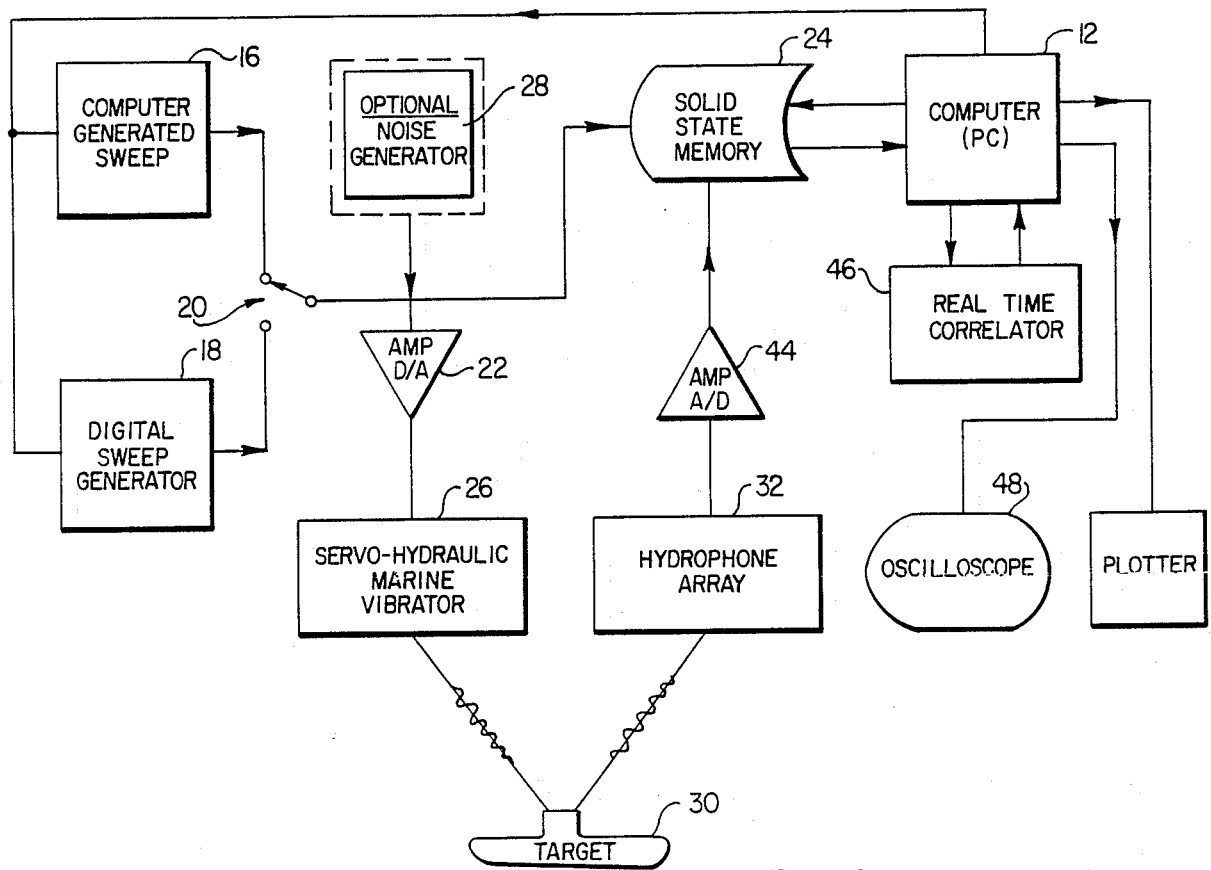
FIG. 1, is a schematic diagram in block form of the vibratory, time variant, pseudorandom sonar system constituting the subject matter of this invention.

The vibratory, time variant, pseudorandom sonar system 10 (FIG. 1) includes a personal computer 12 having a memory containing software program routines for controlling operation of the system 10 and determining bearing and range to target; and a timer including a clock and counter for determining elapsed times for storage in the memory. These elapsed times are the basis of the time variant technique for determining bearing and range to target. The personal computer, which is, for example, an IBM personal computer, or equivalent is connected by lead 14 to control either a tape recorder 16 or a digital sweep generator 18 or both. The tape recorder 16, when used, contains a magnetic tape on which is recorded in random fashion digitized sweeps in the 5–500 Hz frequency range; each sweep has a length of from 3–5 seconds. While, the digital sweep generator 18 is, for example, a Pelton Advance II or equivalent digital sweep generator preprogrammed to produce automatically a variety of random digitized sweeps of RF voltages whose frequency varies back and forth through a given frequency range (5–500 Hz) at a rapid constant rate. The digital sweep generator is also referred to as a sweep oscillator or time base generator. It will be appreciated that the system may be limited to either the tape recorder, or the digital sweep generator.

The tape recorder 16 and digital sweep generator 18, when both are included in the system, are connected to contact terminals of a computer controlled switch 20 whose pole is connected to the junction of a combined digital to analog (D/A) converter and power amplifier 22, and a memory 24. The D/A converter converts the digitized random frequency sweeps into random analog signals and amplifies these signals to produce drive signals switchable for conversion by a servo-hydraulic or electromagnetic marine vibrator, or other suitable transducer 26 to acoustic waves. While, the memory is, for example, a solid state memory having a section for storing the digitized random frequency sweep signals for subsequent use as correlation operator signals.

Optionally, a noise generator (source) 28 is connected to the digitized random frequency sweep outputs of either the computer controlled tape recorder 16 or digital sweep generator 18 to modulate the sweep signals. This modulated output signal is of such complex waveform that it appears as mere sea noise or the like and makes it substantially impossible for a target to distinguish. In addition, if it contains a coded communication the message is substantially impossible to decode without the key thereto and the necessary decoding equipment. It will be appreciated that the recorded sweep signals of the recorder could be such modulated signals; thus, the noise generator 28 can be eliminated from a system including only the tape recorder as the signal source.

The servo-hydraulic or electromagnetic marine vibrator or other suitable transducer 26 transmits acoustical waves through the body of water for reflection off a target 30 such as, for example, a submarine. A suitable vibrator is an I.V.I. vibrator sold by Industrial Vehicles International, Tulsa, Okla.

A hydrophone array 32 consists of at least three non-colinear hydrophones (FIG. 2) for receiving the reflected sonic or ultrasonic signal reflected by the target 30. The hydrophone array may be attached to the ship's hull with each hydrophone positioned as far apart as possible or, it may be towed behind the ship in a non-colinear array.

Each hydrophone 34, 36 and 37 of the hydrophone array is spliced by leads 38 and 40 to corresponding leads of a cable 42. Thus, the marine cable of our example is a three pair cable having three hydrophones attached. The three pair cable 42 is connected to a combined pre-amplifier and analog to digital (A/D) converter 44 (FIG. 1). The amplifier and A/D converter 44 is a three channel unit. Each unit is driven by a hydrophone of the array of hydrophones 32 detecting an echo signal. The combined preamplifier and A/D converter 44 is connected to a section of the memory 24 in which is stored the digitized signals of the three channels during a listening period. The listening time is set by the maximum range selected for target detection.

A crosscorrelator 46 is connected to the computer 12. The computer 12 fetches from memory 24 the digitized source or drive signal and the echo signals for input into the crosscorrelator 46 for crosscorrelation. The resulting signal compression is the signature pulse of the target. The crosscorrelator 46 therefore is a real time multiplier type crosscorrelator. The required integrator and time delay elements are an integral part of the crosscorrelator.

The computer 12 is also programmed to fetch the lapsed times (the travel time) it takes the input acoustic wave to reach a target and the travel times it takes the echo signal to reach the hydrophones of the array of hydrophones 32 and determine therefrom the range and bearing of the target substantially instantaneously.

Although use of existing methods to determine a target's range and bearing may be used, a temporal method is preferred for determining the bearing, Theta ($\theta$) of a plane wave with respect to a horizontal plane. The horizontal plane is defined by three arbitrary non-colinear points Di. Di is indicated by co-ordinates ($r_{i1}$, $r_{i2}$, $Z$), while i=1, 2, 3 and Z=a constant detected by arrival times $t_i$ at each receiver position Di. The X co-ordinate is $r_{i1}$ and the Y co-ordinate is $r_{i2}$, and the bearing vector $u=(u_1, u_2)$. The bearing algorithm using these terms is as follows:

$u_1 = t_1(r_{32}-r_{22}) + t_2(r_{12}-r_{32}) + t_3(r_{22}-r_{12})$
$u_2 = t_1(r_{21}-r_{31}) + t_2(r_{31}-r_{11}) + t_3(r_{11}-r_{21})$ If $u_2 \geq 0$ then $\theta - \arc\cos [u_1/(u_1^2+u_2^2)^{\frac{1}{2}}]$ If $u_2 < 0$ then $\theta = 2\pi - \arc\cos [u_1/(u_1^2+u_2^2)^{\frac{1}{2}}]$ The bearing $\theta$ is determined in radians.

The range to target is determined from the measurement of the elapsed time from time $\emptyset$ of the transmitted signal to the time of the first arrival at the hydrophone array multiplied by the speed of sound as corrected for abnormalities (temperature, density, salinity, etc.).

An oscilloscope 48 or a plotter 50 or both are connected to the computer 12. The oscilloscope 48 and plotter 50 receive the signature pulse of the target together with the target's range and bearing information, respectively, for display by the oscilloscope, or plotting by the plotter, or both.

Figure 2:
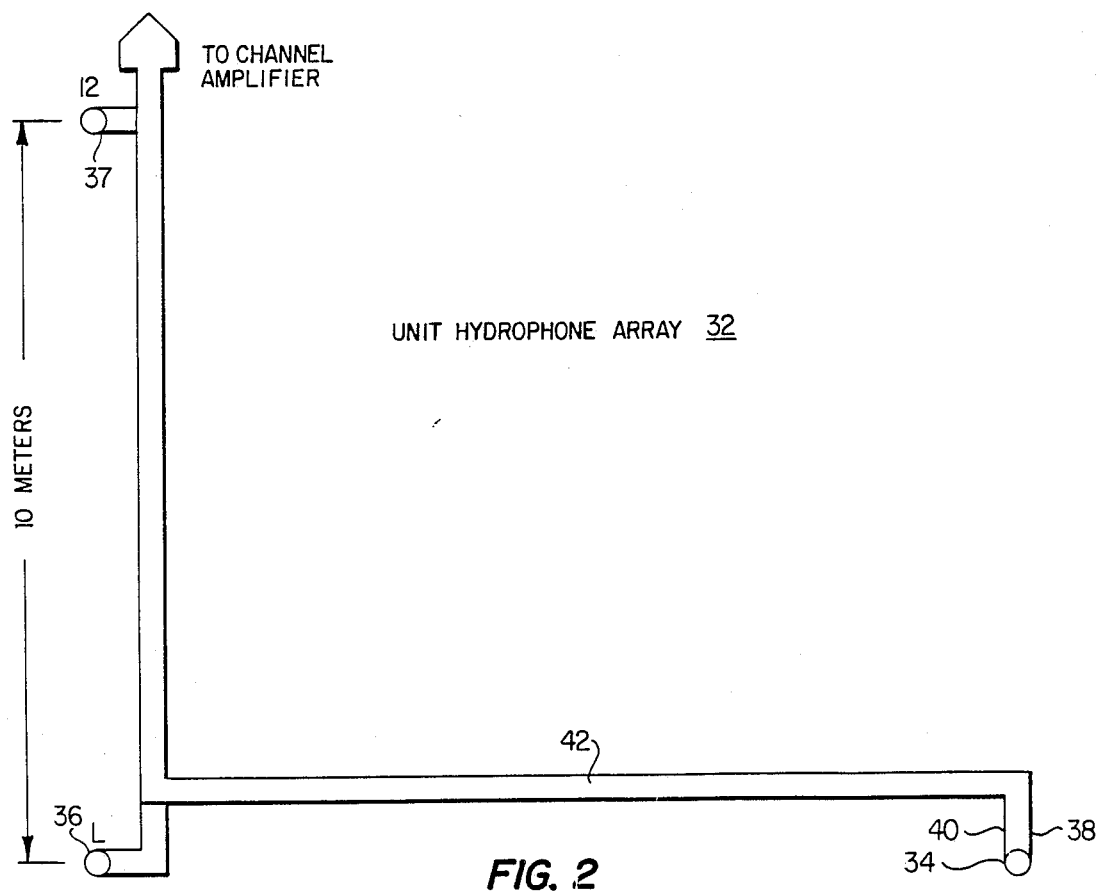
FIG. 2, is a view showing the configuration of a hydrophone array used in the vibratory, time variant, pseudorandom sonar system of this invention.

It will be appreciated by those persons skilled in the art that each of the foregoing components incorporated in the block diagrams in FIGS. 1 and 2 are known and conventional in the art, and that it is their presently disclosed arrangement, interconnection, and interaction which constitutes the subject invention and produces the new and improved results obtained.

In the operation of the system herein disclosed after initialization, the computer 12 outputs an actuation signal to either the tape recorder 16 or digital sweep generator 18. Either of these devices produces a sweep of pseudorandom digitized frequency signals as a source for corresponding pseudorandom acoustic signals. If the noise generator is included it is activated also by the signal to modulate the carrier frequency output of the noise generator 28 with the sweep signals for further disguising the output transmission.

The sweep of pseudorandom digitized frequency signals are concomitantly stored in the memory 24 and after being converted to analog signals by the combined power amplifier, D/A converter 22, are converted to corresponding acoustical waves for transmission into a body of water by the servo-hydraulic or electromagnetic marine vibrator 26 or other suitable transducer. The vibrator 26 is attached to the hull of the carrier at a location remote to that of the hydrophone array 32. The computer 12 fetches the digital source signals for input into the correlator 46 as the reference or correlator operator signal.

The target 30 reflects the acoustic waves as echos for detection by the non-colinear hydrophone array 32. The hydrophone array is either attached to the hull of the carrier or dragged by the carrier through the body of water. Each hydrophone of the array detects each echo signal and outputs a corresponding analog signal for preamplification, conversion to a digital signal and storage in memory.

The computer 12 at the end of a listening time period set by the selected maximum range of detection fetches the stored echo signals from the memory 24 and inputs them into correlator 48 for crosscorrelation with the digitized source signals to produce a target signature for display on the oscilloscope for target identification. Upon receipt of each digitized echo signal, as determined by the crosscorrelator, the computer stops the timer and stores the elapsed time of each as the time variant signals for bearing and range determinations.

The computer 12 fetches the elapsed time (time variant) signals from the memory 12 for us in computing the bearing and range to the target.

The bearing and range to target are determined by the computer 12 determining the location of the intersection of the elapsed times, representing the target, with respect to a point, representing the location of the hydrophone array. The target's range and bearing is determined by the computer as above described.

While a single embodiment of the invention has been described, it will be apparent to those skilled in the art that various changes and modifications thereto can be made without departing from the scope of the invention.

What is claimed is:

1. A vibratory, time variant, pseudorandom sonar system comprising:
   first means for converting an electrical signal into a corresponding acoustic signal for injection into a fluid body for reflection by a target;
   second means including a plurality of detectors selectively spaced for detecting incoming acoustic waves;
   third means for correlating the electrical signals corresponding to the acoustic wave of the first means and the incoming acoustic waves of the second means and generating a signature pulse indicative of the target;
   fourth means for storing the electrical signals and signature pulse generated by the first through the third means;
   fifth means for determining the lapsed times between the injection of the acoustic wave by the first means, and detection of the reflected acoustic wave by the plurality of detectors of the second means;
   sixth means for communicating information to the user; and
   seventh means connected to the: first, fourth, and fifth means, respectively, for activating the first means for injecting the acoustic wave into the fluid body, storing the acoustic wave, and starting the fifth means; second, fourth and fifth means, respectively, for receiving the incoming acoustic waves, storing the incoming acoustic waves detected by the plurality of detectors of the second means, and stopping the fifth means for determining and storing the elapsed times between injection of the acoustic wave and detections of the reflected acoustic waves; fourth and third means, respectively, for fetching the injected acoustic wave and reflected acoustic waves for correlation and generating target signature signals; fourth means for fetching the elapsed time signals for producing bearing and range information; and sixth means for communicating the signature signal together with the bearing and range information.

2. A vibratory, time variant, pseudorandom sonar system according to claim 1 wherein the first means for injecting an acoustic wave into a fluid body includes digital frequency generating means for producing digital pseudorandom frequency sweep signals, converter means connected to the digital pseudorandom frequency sweep signals for converting the digital signals to analog signals and a vibrator means connected to the converter means for producing acoustic waves corresponding to the analog signals.

3. A vibratory, time variant, pseudorandom sonar system according to claim 2 wherein the digital frequency generating means includes a tape having recorded thereon the digital pseudorandom frequency sweep signals.

4. A vibratory, time variant, pseudorandom sonar system according to claim 2 wherein the digital frequency generating means is a digital sweep generator programmed to produce the digital pseudorandom frequency sweep signals.

5. A vibratory, time variant, pseudorandom sonar system according to claim 4 wherein the first means further includes a noise generator connected to the digital frequency generating means for modulating the digital pseudorandom frequency signals on noise signals representative of noises found in the fluid body.

6. A vibratory, time variant, pseudorandom sonar system according to claim 1 wherein the second means is an array of hydrophones, the hydrophones being positioned one to another for receiving the reflected acoustic wave at lapsed times indicative of bearing and range to target.

7. A vibratory, time variant, pseudorandom sonar system according to claim 1 wherein the third means for correlating the acoustic wave and an incoming acoustic wave is a crosscorrelator.

8. A vibratory, time variant, pseudorandom sonar system according to claim 1 wherein the fourth means for storing information generated by the first through the third means is a random access memory.

9. A vibratory, time variant, pseudorandom sonar system according to claim 1 wherein the fifth means for determining the lapsed times includes a timer for producing signals indicative of the time elapsing between the injection of the acoustic wave into the fluid body by the first means and the detection of the incoming reflected acoustic wave by the plurality of detectors of the second means.

10. A vibratory, time variant, pseudorandom sonar system according to claim 1 wherein the sixth means for communicating information to the user includes an oscilloscope.

11. A vibratory, time variant, pseudorandom sonar system according to claim 1 wherein the sixth means for communicating information to the user includes a plotter.

12. A vibratory, time variant, pseudorandom sonar system according to claim 1 wherein the seventh means is a computer for controlling system operation.

* * * * *